United States Patent
Yoon (10) Patent No.: US 11,864,153 B1
(45) Date of Patent: Jan. 2, 2024

(54) ESTIMATING CELLULAR SITE LOCATIONS

(71) Applicant: T-Mobile USA, Inc., Bellevue, WA (US)

(72) Inventor: Jong Sung Yoon, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 198 days.

(21) Appl. No.: 17/238,143

(22) Filed: Apr. 22, 2021

(51) Int. Cl.
*H04W 64/00* (2009.01)
*H04W 4/02* (2018.01)
*H04B 17/318* (2015.01)
*H04W 8/08* (2009.01)

(52) U.S. Cl.
CPC ........ *H04W 64/003* (2013.01); *H04B 17/318* (2015.01); *H04W 4/025* (2013.01); *H04W 8/08* (2013.01)

(58) Field of Classification Search
CPC ......... H04W 64/00; H04W 8/08; H04W 4/02; H04W 4/025; H04W 64/003; H04W 36/0083; H04W 36/00835; H04W 36/00837; H04W 36/0085; H04W 4/023; H04W 4/029; H04W 4/021; H04W 84/045; H04W 84/105; H04W 88/00; H04W 88/08; H04W 56/0095; H04W 8/082; H04W 8/10; H04W 8/12; H04W 8/14; H04W 8/20; H04W 8/22; H04W 8/24; G06F 9/4451; G06F 16/387; G06F 16/587; H04M 3/42348; H04M 15/8038; H04M 2215/34
See application file for complete search history.

(56) References Cited

U.S. PATENT DOCUMENTS

| | | | |
|---|---|---|---|
| 11,073,598 B2 * | 7/2021 | Covaliov et al. | ......... G01S 5/14 |
| 2006/0212259 A1 * | 9/2006 | Seibert | .......................... 702/150 |
| 2008/0039114 A1 * | 2/2008 | Phatak et al. | .............. 455/456.1 |
| 2009/0174600 A1 * | 7/2009 | Mazlum et al. | ......... 342/357.12 |
| 2012/0253957 A1 * | 10/2012 | Bakshi | ............................ 705/18 |
| 2014/0274035 A1 * | 9/2014 | Unger et al. | .......... H04W 48/18 |
| 2014/0278077 A1 * | 9/2014 | Levin et al. | ............ G01S 19/05 |
| 2016/0360354 A1 * | 12/2016 | Rhee et al. | ............. H04W 4/02 |

FOREIGN PATENT DOCUMENTS

EP        1652399 B1 * 3/2006 .............. H04W 8/18

OTHER PUBLICATIONS

Smith et al.: Position Determination (Year: 2017).*

* cited by examiner

*Primary Examiner* — Meless N Zewdu
(74) *Attorney, Agent, or Firm* — Barta, Jones & Foley, PLLC (57) ABSTRACT

Solutions for estimating a cellular site location, for example in a roaming network, includes receiving data metrics from a plurality of user devices corresponding to communications using a roaming carrier network, wherein the data metrics are stored on the plurality of user devices during the communication using the roaming carrier network, and the data metrics are received using a home carrier network. The received data metrics is filtered to identify the roaming carrier network and the filtered data metrics group corresponding to a cell within the roaming carrier network. A source of a signal corresponding to the cell is determine and the location of the cellular site corresponding the source of the signal estimated.

20 Claims, 7 Drawing Sheets

ESTIMATING CELLULAR SITE LOCATIONS

BACKGROUND

Cellular sites, often referred to as cellular towers or cellular base stations (BSs), are geographically positioned to define coverage areas in a cellular network. These cellular sites are cellular-enabled mobile device sites having antennas and electronic communications equipment, typically on a radio tower or other raised structure to create a cell in the cellular network.

While the use of particular cellular sites within the network of a network carrier (home network) by mobile devices can be determined, when these mobile devices roam and use cellular sites not within the home network, the determination is often not possible or the information not available from the network carrier of the roaming network. That is, when a mobile device switches to communication within the roaming network, the home carrier network is not able to determine with which cellular sites in the roaming network the mobile device is communicating. It would be desirable for upgrading, coverage planning, etc. to be able determine which mobile devices are communicating with which cellular sites in the roaming network, as well as, where the cellular sites are located.

SUMMARY

The following summary is provided to illustrate examples disclosed herein, but is not meant to limit all examples to any particular configuration or sequence of operations.

Solutions for estimating a cellular site location include a computerized method comprising receiving data metrics from a plurality of user devices corresponding to communications using a roaming carrier network, wherein the data metrics are stored on the plurality of user devices during the communication using the roaming carrier network, and the data metrics are received using a home carrier network. The computerized method further comprises filtering the received data metrics to identify the roaming carrier network and grouping the filtered data metrics corresponding to a cell within the roaming carrier network. The computerized method also includes determining the source of a signal corresponding to the cell and estimating the cellular site location using the source of the signal.

BRIEF DESCRIPTION OF THE DRAWINGS

The disclosed examples are described below with reference to the accompanying drawing figures listed below, wherein.

Corresponding reference characters indicate corresponding parts throughout the drawings. References made throughout this disclosure relating to specific examples, are provided for illustrative purposes, and are not meant to limit all implementations or to be interpreted as excluding the existence of additional implementations that also incorporate the recited features.

DETAILED DESCRIPTION

Solutions for estimating the location of cellular sites, particularly in roaming networks, use information collected by mobile devices when roaming (e.g., when using the network operated by a different cellular provider than the cellular provider for the mobile subscription) to identify different cellular sites within a roaming network with which the mobile devices communicated. For example, various examples identify cellular sites within the roaming network having the most usage by mobile devices of a particular mobile provider. That is, computing devices and methods described herein identify the cellular site locations or areas having the most roaming users.

Aspects of the disclosure improve the ability to identify cellular sites used by roaming users. That is, the cellular sites having the highest roaming traffic are more easily and efficiently identified. For example, with the present disclosure, roaming cellular coverage to be converted to a home cellular site are identified, which allows for maximizing gain from installing and operating equipment using one or more roaming cellular sites in the roaming cellular coverage region for home signal coverage. As a result of performing the operations described herein, the optimal site locations for converting roaming cellular coverage (e.g. roaming coverage area) to a home cellular coverage (e.g., home network coverage area) are identified in some examples. In this manner, when a processor is programmed to perform the operations described herein, the processor is used in an unconventional way, and allows for the more efficient and accurate identification and determination of the location of roaming cellular coverage and/or sites.

As should be appreciated, the present disclosure can be implemented in different networks having different devices. That is, one or more examples described herein can be used with different BSs communicating with different types of user equipment (UE) using different networks (e.g., third generation (3G) mobile networks, fourth generation (4G) mobile networks, fifth generation (5G) mobile networks, etc.) and communication protocols. Moreover, while various examples use the 3rd Generation Partnership Project (3GPP) protocols when communicating and collecting data, other protocols and communication methods can be used.

In various examples, a plurality of data metrics are collected from user devices and analyzed to determine (e.g., find) the locations of roaming communications, such as the location and density of communications at particular roaming locations. The analysis allows, for example, for determining locations to install home cellular coverage or convert roaming cellular coverage to home cellular coverage. In some examples, a roaming usage map is generated that shows areas of highest roaming activity, including allowing for identifying cellular sites or towers corresponding to the highest roaming activity. It should be appreciated that with the present disclosure, different levels of roaming activity corresponding to different cellular sites can be determined.

Figure 1:
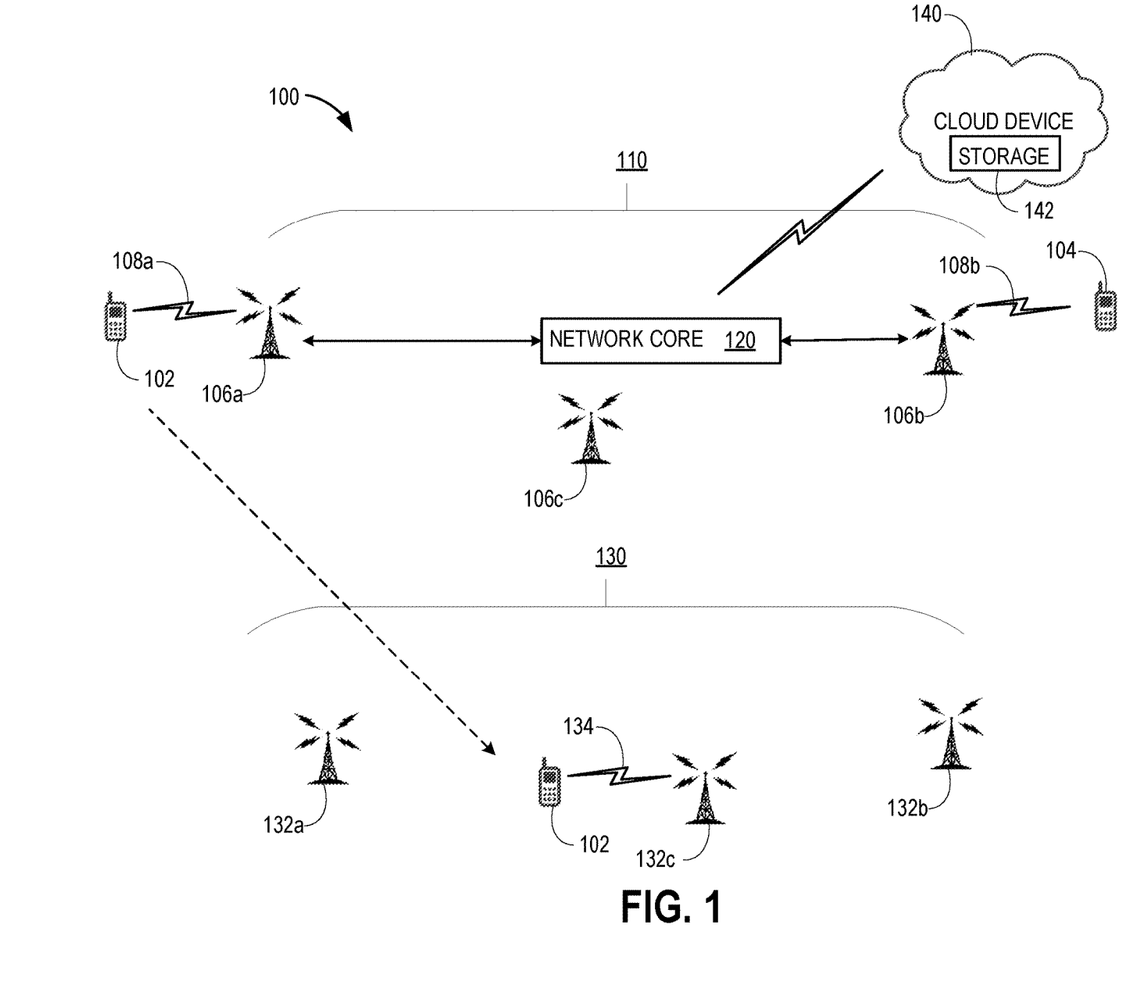
FIG. 1 illustrates an arrangement in which estimation of cellular site locations corresponding to roaming activity can advantageously be employed according to an example.

With reference now to the figures, FIG. 1 illustrates an arrangement 100 in which estimation of cellular site locations corresponding to roaming activity can advantageously be employed. In the arrangement 100, a UE 102 on a home network 110 is able to communicate with another UE 104 using one or more BSs 106 (illustrated as BS 106a and BS 106b), which are home BSs in this example. That is, the BSs 106 are configured or installed with equipment from the cellular provider of the UE 102 and UE 104. For example, the UE 102 communicates with the network 110 using an air interface 108a to the BS 106a and the BS 104 communicates with the network 100 using an air interface 108b to the BS 106b. In some examples, each BS 106 comprises a cellular tower having multiple cells positioned in different radially directions to allow for 360 degree communication via the BS 106. It should be noted that the network 110 in the illustrated example is the home network for the UE 102 and UE 104, and can include a mixture of cells, for example, a mixture of 5G and 4G cells. It should be noted that the network includes other BSs, such as the BS 106c.

In the illustrated example, the network 110 includes a core network 120 that receives connection and session related information from the UE 102 to allow communication with the UE 104 (e.g., provides a pathway between the UE 102 and the UE 104). The network 110 may be distributed, for example, with various nodes at differing geographical locations. It should be noted that the network 110 allows for communication between the UE 102 or the UE 104 with other UEs, which can be other mobile devices. In some examples, the other UEs are non-cellular or mobile devices, such as landlines.

In the illustrated example, the UE 102 travels or moves into a network 130, which is a roaming network. As can be seen, the BSs 132 in the network 130 do not communicate with the network core 120 or other components of the network 110. Thus, communication information relating to the UE 102 while using one of the BSs 132 is not available to the network core 120, such as the BS 132 with which the UE 102 is communicating (illustrated as BS 132c using an air interface 134). That is, when the UE 102 is roaming within the network 130, the home network (i.e., the network 110) is unable to ascertain information regarding the communications using the UE 102, such as which BSs 132 the UE 102 used for communication.

Figure 2:
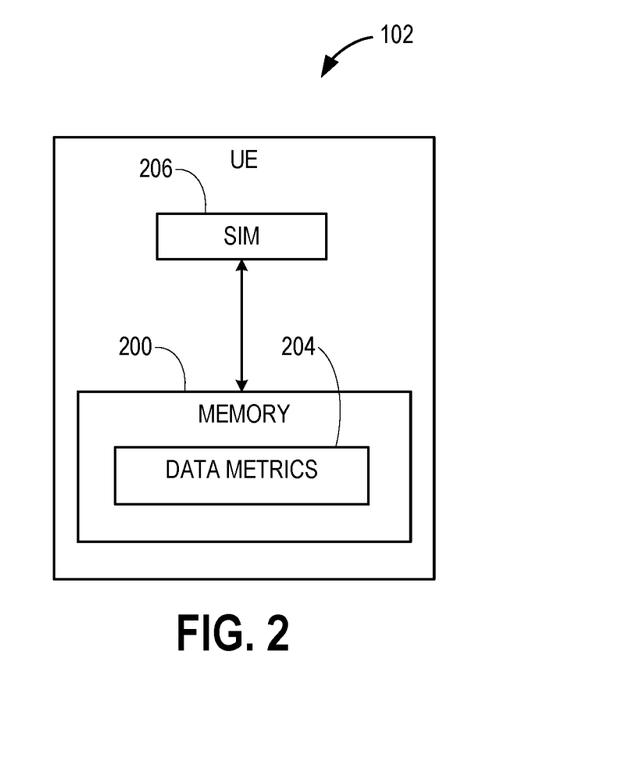
FIG. 2 is a block diagram of user equipment according to an example.

In some examples, communication or other UE operating information is used to identify cellular sites with which the UE 102 has communicated, particularly roaming cellular sites with which the UE 102 communicated when outside of the home network 110. That is, using different types of information (e.g., data metrics) recorded and stored within the UE 102 during operation within the network 130, the BSs 132 with which the UE 102 communicated are identified, including calculating the estimated locations of the BSs 132. In one example, data metrics stored within a memory 200 of the UE 102, as shown in FIG. 2, are analyzed to identify and estimate the location of the BSs 132 used by the UE 102 when roaming. It should be noted that the data metrics can be stored in different storage devices or other components within the UE 102.

It should also be noted that different data is acquired by the UE 102 and stored in the memory 200. In some examples, the data stored within the memory 200 is data that is acquired during normal operation of the UE 102. In other examples, the UE 102 can be configured to acquire additional information for use in determining the BS usage by the UE 102 when roaming. The different types of data stored and analyzed to identify the BSs 132 is described in more detail below. It should be noted that in various examples, a subscriber identity module (SIM) 206 (e.g., a SIM card) is installed within the UE 102 and identifies a mobile subscription for the UE 102. The SIM card also determines the home carrier network in various examples.

With particular reference to FIG. 2, a memory 202 generally includes both volatile memory and non-volatile memory (e.g., RAM, ROM, Flash Memory, miniature hard drive, memory card, or the like). Additionally, in the illustrated example, the SIM 206 is configured as a memory device. It should be appreciated that in some examples, the memory 202 includes one or more SIM cards, which are removable memory cards.

In some examples, the memory 202 includes one or more modules configured to gather performance metrics, which are used to identify and calculate the locations (e.g., estimated locations) of the roaming BSs 132. In some examples, the one or more modules are configured to perform other operations, such as to create schemas and to provide the performance metrics and schemas as reports to the service provider network, among performing other cellular communication functionality.

Figure 3:
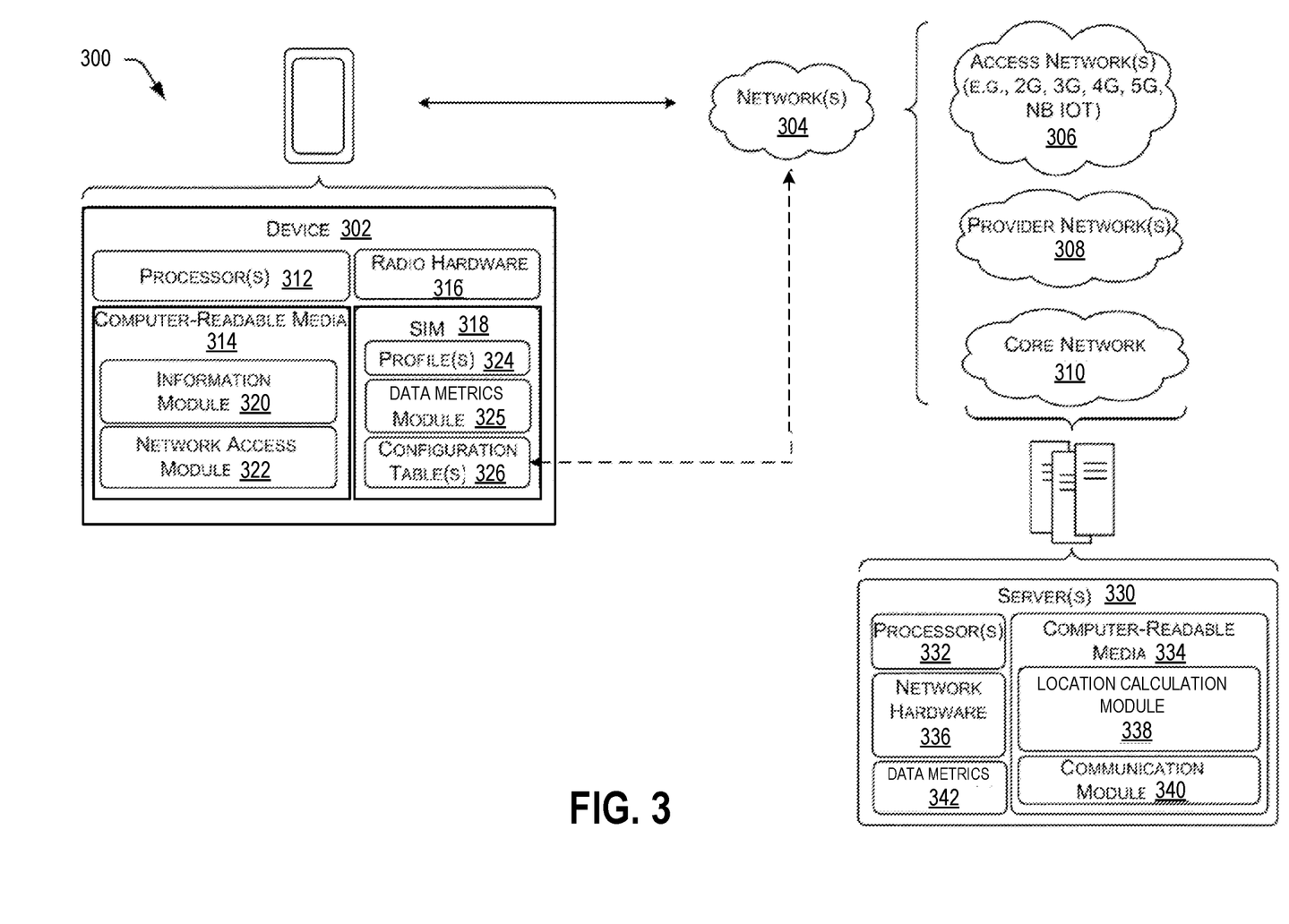
FIG. 3 is a block diagram of an operating environment according to an example.

One configuration of an operating environment 300 for implementing various examples, such as to determine the location of cellular sites, is illustrated in FIG. 3. The operating environment 300 includes a device 302, which is embodied as the UE 102 in one example, and that is in communication with one or more networks 304. The network(s) 304 can include access network(s) 306, provider network(s) 308, a core network 308 (which, in some examples can be a carrier network), etc. As described in more detail herein, the networks 304 can be home networks or roaming networks.

The access network 106, in one example, is a network that connects subscribers (e.g., mobile computing devices associated therewith) to a service provider (e.g., a telecommunications service provider). The service provider can be associated with the core network 310. The core network 310 can connect one or more other service providers to one another. The one or more other service providers can be associated with the provider network(s) 308. Mobile computing devices, such as the device 302, can utilize various access technologies to establish a connection to the access network(s) 306, the provider network(s) 308, the core network 310, and so forth. For example, mobile computing devices, such as the device 302, can support one or more access technologies including, GSM/2G, UMTS/3G, LTE/4G, NR/5G, etc.

In at least one example, the device 302 (which can additionally or alternatively be referred to herein as "a mobile computing device") can be embodied as the UE 102 configured as, for example, a smart phone, a personal digital assistant, a netbook, a laptop computer, a smart appliance, and/or another electronic device that is capable of transmitting or receiving audio, video, and/or data via the network(s) 304. In at least one example, the device 302 includes one or more processors 312, computer-readable media 314, radio hardware 316, and a SIM 318 (which is embodied as the SIM 200 shown in FIG. 2 in some examples).

The one or more processors 312 can be, for example, a central processing unit (CPU)-type processing unit, a graphics processing unit (GPU)-type processing unit, a Field-Programmable Gate Array (FPGA), another class of Digital Signal Processor (DSP), or other hardware logic components that can, in some instances, be driven by a CPU. For example, and without limitation, types of hardware logic components include, but are not limited to, Application- Specific Integrated Circuits (ASICs), Application-Specific Standard Products (ASSPs), System-on-a-Chip Systems (SOCs), Complex Programmable Logic Devices (CPLDs), etc. In various examples, the processor(s) 312 are configured to execute one or more modules and/or processes to cause the device 302 to perform a variety of functionalities as described herein, including to collect and analyze the data metrics 204 to calculate cellular site locations, particularly in a roaming network. Additionally, each of the processor(s) 312 comprises local memory in some examples, which also stores program modules, program data, and/or one or more operating systems.

Depending on the configuration and type of the device 302, the computer-readable media 314 includes computer storage media and/or communication media. Computer storage media can include volatile memory, nonvolatile memory, and/or other persistent and/or auxiliary computer storage media, removable and non-removable computer storage media implemented in any method or technology for storage of information such as computer readable instructions, data structures, program modules, or other data. Computer memory is an example of computer storage media. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disk read-only memory (CD-ROM), digital versatile discs (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

By way of example and not limitation, computer readable media comprises computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. In contrast, communication media typically embody computer readable instructions, data structures, program modules, or the like in a modulated data signal such as a carrier wave or other transport mechanism and include any information delivery media and which can be accessed by the device 302. Any such non-computer-readable media can be part of the device 302.

In the illustrated example, the computer-readable media 314 includes one or more modules and data structures including, for example, an information module 320 and a network access module 322. The one or more modules and data structures can be in the form of stand-alone applications, productivity applications, an operating system component, or any other application or software module configured to facilitate the operations and functionality as described herein.

In one example, the information module 320 is configured to access information associated with the device 302. In at least one example, the information module 320 accesses information responsive to an event. An event can be, for example, a boot up of the device 302, a lapse of a predetermined period of time associated with a polling cycle, a change in location of the device 302, and so on. In some examples, the information module 320 can access the information responsive to receiving a request for such information from the SIM 318.

In at least one example, the information module 320 sends a request for information to the network(s) 304, which responds to the request with at least some information (e.g., the data metrics 204). In an additional or alternative example, the information module 320 accesses information from the device 302. For example, the information module 320 access location information, which can be any data that indicates a location of the device 302. The location can include, but is not limited to, a mobile country code (MCC), a mobile network code (MNC), a cell identifier, a location area code (LAC), a cell ID, latitude information, longitude information, etc. In additional or alternative examples, the information module 320 accesses additional or alternative information, such as a timestamp of a current time, a date stamp associated with a current date, a current network address translation (NAT), such as the NAT of which the device 302 is currently using to access the network(s) 304, etc.

The network access module 322 in one example is configured to send requests to access the network(s) 304 via particular NATs. In at least one example, the network access module 322 sends a request to the SIM 318 that indicates the NAT via which the network access module 322 desires to use to access the network(s) 304.

In the illustrated example, radio hardware 316 provides wireless UE capabilities, such as connecting to a base station (e.g. the BSs 106 and 132 shown in FIG. 1) associated with the network(s) 304, which may be embodied as the networks 110 and 130 (shown in FIG. 1). The radio hardware 316 includes or can be incorporated into processors, ASICs, programmable circuits such as FPGAs, or in other ways. In at least one example, the radio hardware 316 includes radios associated with one or more of NATs (e.g., 2G, 3G, 4G, 5G, etc.). The radio hardware 316 enables the device 302 to connect to a base station associated with the network(s) 304. The base stations (also known as cellular sites or cell towers) can be associated with antennae and other electronic communications equipment (e.g., transceivers, digital signal processors, control electronics, a GPS receiver, etc.) to create a cell in a cellular network, the locations of which, particularly in roaming networks, are calculated as described in more detail herein.

The SIM 318 can be a SIM card (e.g., embodied as the SIM 200) or an eSIM (e.g., an embedded, electronic, and/or enhanced SIM). The SIM card can be a portable memory chip or an integrated memory chip. It should be noted that each SIM card includes a unique number printed on the memory chip that requires activation by the service provider (e.g., via a website associated with the service provider, via a call to the service provider, via provisioning by the service provider, etc.). Following activation of an account by the service provider, the subscriber, via the mobile computing device, can utilize various services offered by the service provider.

In some examples, with an eSIM, a profile (e.g., an eSIM profile) including a unique number (e.g., associated with a service provider) and other data (e.g., account information (e.g., subscription key, identity and/or service plan profiles, etc.), restrictions, etc.) can be downloaded by a mobile computing device, and no further activation is required to activate an account associated with the service provider and/or otherwise use services available from the service provider.

The SIM 318 in various examples stores personal information of a subscriber, such as, but not limited to, data associated with a phone number of a subscriber associated with the device 302, an address book of the subscriber, text messages sent and received via the device 302, and other data. Additionally, in at least one example, the SIM 318 stores an indication of a current MCC, MNC, cell identifier, LAC, etc. In at least one example, the SIM 318 is associated with an identifier that is a unique code particular to the SIM 318. That is, the identifier uniquely identifies the SIM 318 that is associated with the device 302. In at least one example, the identifier is an embedded Universal Integrated Circuit Card-Identifier (e.g., eUICC-ID, eID, etc.).

In at least one example, the SIM 318 is associated with one or more profile(s) 324. That is, the profile(s) 324 can be stored on the SIM 318 or can otherwise be accessible by the SIM 318. In one example, the profile(s) 324 indicate which service plans, services, functionalities, etc. are available for the device 302 from a particular service provider. In at least one example, particulars of a service plan can be indicated in a profile of the profile(s) 324.

Additionally, the data metrics module 325 is configured to store information used to calculate the location of the BSs 132. In one example, data metrics module 325 is configured as an agent installed on the device 302 to collect the data metrics 342, such as to collect connection status on the device 302, etc. when the device 302 is connected to a roaming network. Then, when the device 302 is connected back to the home network, the data metrics 342 collected by the device 302 are delivered to one or more servers 330 in the home network. As such, usage information while the device 302 is on, for example, a roaming partner network, is thereby acquired, which otherwise is not available from the partner network.

Additionally, one or more configuration table(s) 326 are stored on or otherwise available to the SIM 318. The configuration table(s) 326 are look-up table(s) or other types of data structures for storing communication configurations. The configuration table(s) 326 in some examples are provided to the SIM 318 from a service provider that is associated with the core network 310. The service provider can dictate configurations in the configuration table(s) 326 and can update the configuration table(s) 326 over time. Such configurations indicate which NATs are permitted at particular dates, times, locations, and so on. This information can also be used when calculating the location of the cellular sites.

The location information (e.g., a MCC, a MNC, a cell identifier, a location area code, etc.), a timestamp, a date stamp, and other data are described as being stored in the SIM 318. It should be appreciated that the information can be stored in any type of suitable storage.

In at least one example, the core network 310 is associated with one or more server computing devices (e.g., server(s) 330). The server(s) 330 can be any type of server, such as a network-accessible server. In some examples, the server(s) 330 is a stand-alone computing systems, distributed-computing systems, networked-computing systems, etc. For instance, in at least one example, one or more of the functionalities described herein as being performed by the server(s) 330 can be performed by a single device or multiple devices. In some examples, one or more of the functionalities described herein can be performed by the device 302 instead of, or in addition to, the server(s) 330. Similarly, in some examples, one or more of the functionalities described herein as being performed by the device 302 can be performed by the server(s) 330 instead of, or in addition to, the device 302.

In various examples, each of the server(s) 330 include one or more processors 332, computer-readable media 334, and network hardware 336. In at least one example, the computer-readable media 334 includes a location calculation module 338 and a communication module 340. The one or more modules and data structures can be in the form of stand-alone applications, productivity applications, an operating system component, or any other application or software module configured to facilitate the calculation of site locations, as described herein, including, for example, generating a site location map based on the calculations.

In at least one example, the location calculation module 338 accesses the data metrics 342 associated with a plurality of UEs 102 (e.g., collected communication or connection/usage information for the UEs 102 during roaming operation). The data metrics 342 can be stored locally with the server(s) 330 (as illustrated) and/or be stored remotely and be accessible to the server(s) 330. It should be noted that the operations performed herein, including by the location calculation module 338 can include machine-learning mechanisms (e.g., supervised, unsupervised, deep learning based, etc.). That is, machine-learning mechanisms can be used by the location calculation module 338 to facilitate the determination of cellular site locations.

The communication module 340 in some examples is configured to establish and facilitate communications between devices, such as the device 302, and the network(s) 304.

The processes described herein can be implemented in hardware, software, or a combination thereof. The example processes are described in the context of the environment of FIG. 3, but are not limited to that environment. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functionalities or implement particular abstract data types. In other example, hardware components perform one or more of the operations. Such hardware components can include or be incorporated into processors, ASICs, programmable circuits such as FPGAs, or in other ways. The order in which the operations are described is not intended to be construed as a limitation, and any number of the described operations can be combined in any order and/or in parallel to implement the processes.

In one example, the data metrics 342 include network identifying parameters (referred to as GEOs in CDMA systems) defining a geographic area based upon where the grouped parameters are received. For example, in a 3GPP (CDMA) network, the identifying parameters are the SID (system ID) and the NID (network ID). Within a 3GPP (GSM) network, the network identifiers includes the MCC, the MNC, and the cell ID. Each of these network identifiers has a particular geographic area that is associated therewith. Other data used by one or more examples includes the Evolved-UMTS Terrestrial Radio Access Network (E-UTRAN) global Cell ID (ECI), and other geographic information, such as latitude information and longitude information for the device 302.

The above-discussed metrics, or a subset thereof, can be collected on different triggering events, such as a defined time period (e.g., every hour), on a call start, on a call end, on data session start, and on a data session end, among others. In some examples, this data is stored for a plurality of devices 302 (e.g., the UEs 102) in a database as records corresponding to each of the UEs 102 and having an associated timestamp. In one example, the collected data is transmitted to a cloud device 140 for storage and/or processing. The collected data is transmitted to the cloud device 140 at defined time intervals (e.g., periodic basis, such as daily) and is aggregated and stored in cloud storage 120 for analysis in some examples.

In one example, with MCC/MNC information collected from a plurality of the devices 302 and an identification of the devices 302 that connected to a roaming service are identified (e.g., 310/260 for T-Mobile service and 310/450 for Viaero service). Within the roaming service, a corresponding cell is identified using the collected information. For example, the ECI includes eNodeB and cell ID information, which defines a unique identifier for each cell. In one example, one eNodeB is considered as a group of one or more cells wherein one eNodeB is installed at one cellular site location. The eNodeB ID on each stored record is calculated and identify all locations reported with the same eNodeB ID. The center (e.g., geographic center) of the locations or source of the signal in latitude/longitude is determined to estimate the cellular site location in one example. With this information, the cellular coverage areas (which can include one or more cellular site locations) with the most traffic then can also be identified in some examples, which allow for future communication planning, such as locations for site expansion.

It should be noted that different approaches can be used to estimate the site locations for the BSs 132. For example, the average of latitude and longitude, the median of latitude and longitude, or the weighted average of latitude and longitude based on the signal strength (reference signal received power (RSRP), which is a signal level metric) is additionally collected for this determination. In the weighted average approach based on the RSRP (e.g., LTE signal strength), it is assumed that stronger signal is measured nearer to the cellular site, and conversely, the weaker the measured signal, the farther from the cellular site. As such, larger weights are added to signals (records) from latitudes and longitudes with stronger RSRP values when calculating the average. That is, the determined source location of the signal becomes the site location.

Figure 4:
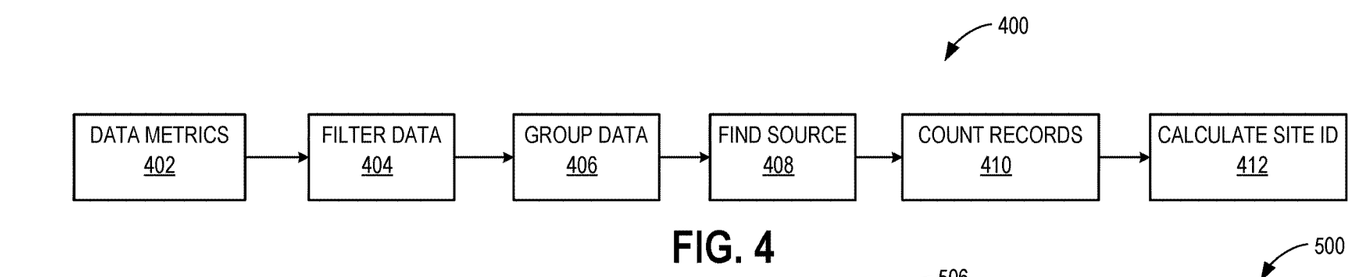
FIG. 4 illustrates a process flow for calculating cellular site locations according to an example.

A process flow 400 for calculating cellular site locations in one example is illustrated in FIG. 4. That is, the process flow 400 illustrates an example of the operations performed to calculate cellular site locations. In some examples, the calculations results in an estimated location of one or more cellular towers, which results can then be used in to identify one or more cellular towers corresponding to the estimated locations for upgrading or conversion (e.g., upgrading or conversion of cellular coverage). In some examples, the process flow 400 defines a processing pipeline that filters the collected data.

The process flow 400 includes obtaining data metrics at 402. That is, information is collected from a plurality of user devices (e.g., a plurality of the UEs 102) over a period of time. This information includes different connection information as described herein that is stored on the user devices, particularly when the user devices are operating in a roaming network. In one example, crowd sourced data collection is used, such as ECI voice information. In this example, defined data fields include data metrics used in the process flow 400, such as the MCC/MNC, Cell ID, and Geo location. As described herein, the MCC/MNC is the ID of the connected carrier, the Cell ID is the ID of the connected cell, and the Geo location is the geographic location of the user device in latitude and longitude. It should be appreciated that different types of information can additionally or alternatively be used, including from different data sources.

The collected information, namely the data metrics, is then filtered at 404. In one example, the collected data is filtered based on the MCC/MNC to identify data associated with one or more roaming carriers. That is, in one example, the collected data is filtered to identify data metrics corresponding only to roaming networks or roaming partners, or to specific networks of interest.

The filtered data is then grouped at 406. For example, the data corresponding to each of the roaming networks is grouped by Cell ID to identify the corresponding connected cell within the roaming networks. In one example, the collected data for all the devices connected with a cell during a defined time period are grouped together. As such, a subset of the collected data is thereby defined. That is, a subset of connection records corresponding to the cell is identified.

The source of the signal corresponding to the collected data for each cell is the then determined at 408. For example, the source of the signal based on latitude and longitude of the user device is determined. As described in more detail herein, finding the source includes determining the location of the source of the signal using one or more methods.

The number of records is then counted at 410. For example, the number of connection records for user devices at the source of the signal during the defined time periods is counted. An example of a resulting output is: (Cell ID 1, lat1/long1, 1003). The first field identifies the Cell ID number, the second filed identifies a corresponding latitude and longitude, and the third field identifies a record count.

The site ID is then calculated at 412. Continuing with the above example, the site ID is calculated based on the following data: 1) Site ID A, Cell id 1, lat1/long1, 1003, and 2) group by the site ID. That is, this information defines the site ID. As described in more detail herein, the site ID allows for a determination of the cellular site location, which is used to identify one or more coverage areas or regions for conversion in some examples.

It should be noted that the delivery of the collected data, such as the data metrics 402 can be performed as different time intervals, including at a random schedule for delivery to the home network. However, as should be appreciated, the data is only delivered or transmitted when the user device is on a home network connection. If the user device is roaming, the delivery or transmission of the data is delayed until a next delivery time, when the network connection is again checked to confirm a home network connection.

It should also be noted that the collected data can be stored in any type of data repository. That is, the collected data can be stored in one or more data storage devices, which may be local, remote, in the cloud, etc. The process flow 400 is operable on data stored in different locations by different devices. For example, the process flow 400 is configured to process data collected and stored in repositories to, for example, identify the locations of roaming partner connection sites that are most heavily utilized by home partner users, such that a priority list is generated for installing and/or replacing roaming network coverage with home network coverage.

The cell locations, such as the roaming partner cell locations (e.g., cell towers) are determine in one example, as follows:
a. Identify device locations when on roaming partner network;
b. Plot all the different device locations;
c. Find "center" or "source" of all those locations to estimate the likely location of the partner site by one of:
   1. An average of latitude and longitude;
   2. A median of latitude and longitude; or
   3. Use signal levels to determine the direction of strongest signal (by identifying the direction for when the signal increases/decreases in strength, which will be used in this example);
d. Use the signal strength metrics to weight the geolocation of each device; and
e. Associate the number of connections to that site.

Figure 5:
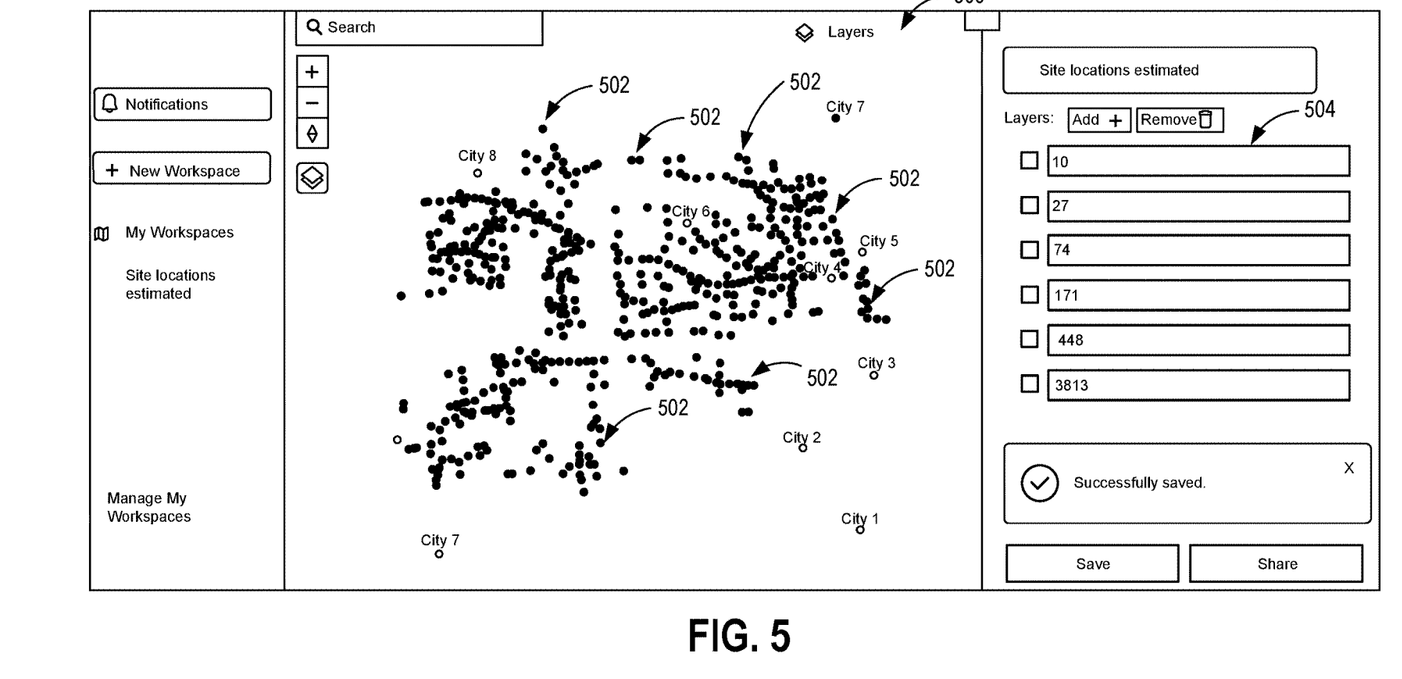
FIG. 5 illustrates a graphical user display according to an example.

As a result, prioritization information in a graphical user display 500 (e.g., a dashboard) as illustrated in FIG. 5 is displayed in one example. The graphical user display 500 includes indicators 502 on a map 506 (that includes other geographic indicators, such as different cities, etc.) of the estimated roaming cellular site locations (e.g., roaming site location map), wherein a characteristic or feature of the indicators corresponds to a record count for that location. For example, a color and/or size of the indictor 502 corresponds to the value of the record count at that location, which is representative of a level of data traffic at that location. For example, different colors correspond to different levels of data traffic at the corresponding roaming network cellular site. In the illustrated example, a legend 504 is displayed to identify the traffic levels corresponding to the different colors. In one example, the indicators 502 corresponding to the traffic levels to be displayed can be selected using the legend 504. That is, filterable features are provided for a more granular understanding of the data. It should be appreciated that other filterable features are contemplated, such as based on geographic location, roaming network provider, etc.

It should be noted that the cellular sites, particularly the cell tower locations can be determined using different processes. For example, one cell tower typically has multiple individual cells (one cell typically covers 112 degrees, so three cells facing different directions in a triangular formation are used to cover 360 degrees). In one example, the present disclosure identifies the tower location (i.e., not the individual cell location), such that at least three individual cell locations are identified that correspond to a similar location to confirm the tower location. That is, with the identification of three cells in a geographic location, the three cells likely correspond to a cell tower location.

In one example, the individual cells are identified using the following: ECI=(Cell ID is defined in 3GPP as eNodeB ID+Cell ID (2 octets). For example, with an ECI value of 12345678, the following is performed:
1. calculate Cell ID=Mod(12345678, 256), which results in the Cell ID;
2. eNode B ID=(12345678−Cell ID)/256; and
3. the last two digits become the cell ID and the remaining digits become eNode B ID (1F1d3a-EF).

It should be noted that only one eNodeB ID is deployed per site (per tower location). As such, using the ECI, the eNodeB ID is calculated and then the tower location is inferred when two individual devices connected to two individual cells have the same eNodeB ID. It should be noted that by using site ID (eNodeB ID) instead of the Cell ID, the number of calculations is thereby reduced.

In some examples, the cell locations are first determined. Then, the cells are grouped by site ID and the center of the grouped cells located (e.g., calculated or found). This can be performed, for example, by grouping all the locations by the site ID to go straight to the site location. The number of calculations is reduced in some examples when using the site ID directly.

Figure 6:
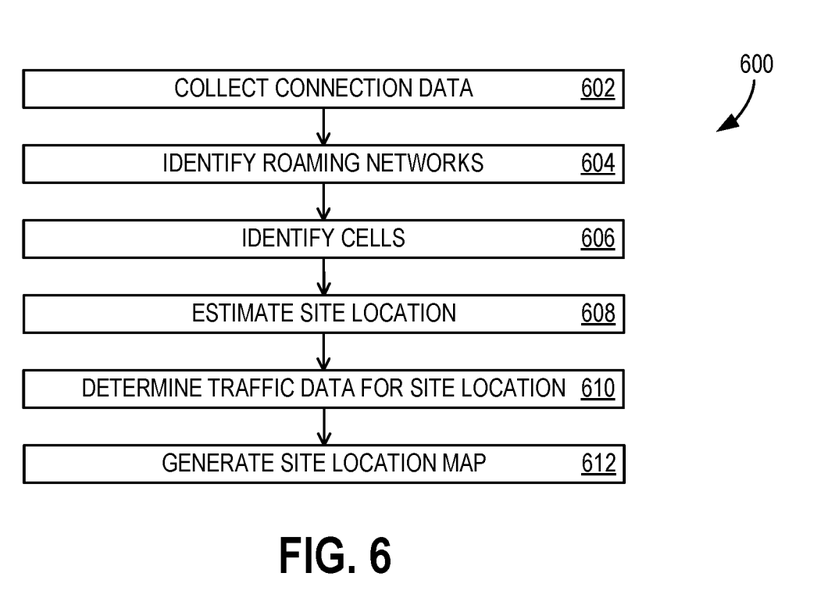
FIG. 6 illustrates a flowchart of operations associated with cellular site location determination according to an example.
Figure 7:
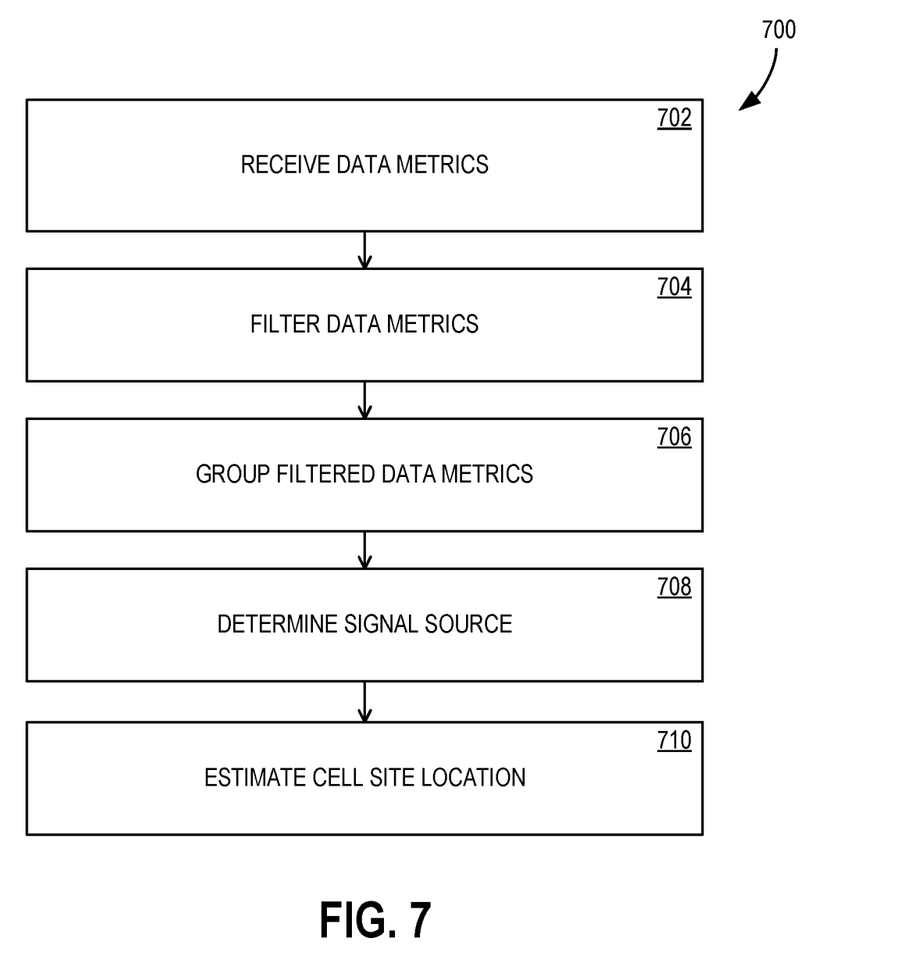
FIG. 7 illustrates another flowchart of operations associated with cellular site location determination according to an example.

FIGS. 6 and 7 illustrates flowchart 600 and 700 of operations associated with cellular site location determination, for example, showing a set of operations that produces estimated locations of cellular sites in a roaming network according to various examples. In some examples, at least a portion of flowchart 600 or the flowchart 700 can be performed using one or more computing devices 800 of FIG. 8. In the illustrated example of the flowchart 600, operation 602 includes collecting connection data, which can include collecting certain data fields within a dataset obtained while a user device is operating within a roaming network. In one example, data is collected from the user devices every time the user makes a voice call. Using the collected data (e.g., MCC/MNC, Cell ID, and Geo location) as described in more detail herein, the carrier network to which the device was connected is known, as well the cell and the location of the user device at the time.

Operation 604 includes identifying one or more roaming networks based on the connection information. For example, the collected connection data is filtered on the MCC/MNC as described herein to identify the roaming connection. As such, by filtering the voice data for MCC/MNC, the results outputted include all the data samples on the roaming connection. That is, using the MCC/MNC samples, one or more roaming networks can be identified.

Operation 606 includes identifying one or more cells (using the cell ID and Geo locations), which can then be used to estimate the site locations. For example, filtering the voice data for Cell ID results in identifying all the locations of the user devices when the user devices were connected to the cell having the Cell ID.

Operation 608 includes estimating site locations using the device locations. That is, as described herein, the cell ID and geolocations are used to estimate the site location. For example, the voice data is filtered data for a cell ID, which allows for identifying all the locations of the user devices when user device were connected to the cell having the Cell ID. The user device locations are then used to estimate the site location. As described herein, one site has multiple cells, while each cell is located to cover a certain direction. As such, the site locations are determined in various examples, and not the cell locations. Assuming that a roaming carrier installed the cells to cover multiple directions from the same site, the middle of the user device locations is determined as the estimated roaming network site location. However, as described herein, other location calculation methods can be performed.

Thus, the site ID and the cell ID are derived from voice cell ID field for the voice data, which in one example, is performed as follows:
1. 'cell ID'='ECI' % 256; and
2. 'site ID'=('ECI'−'ECI cell ID' % 256)/256.

In this example, the cell ID 12345678 means 'cell ID'=78 and 'site ID'=48225. Then, the site locations are calculated, which can be performed using latitude and longitude data for the user devices during the roaming connections. In addition, or alternatively, the location information is filtered for the locations with strong signal levels based on the RSRP as described herein. For example, a threshold RSRP level is used.

Operation 610 includes determining data traffic at the estimated site locations, for example, by summing record locators for user devices connected to the estimated site locations. For example, the number of connections at each of the estimated site locations is summed over a defined time period. It should be appreciated that various criteria can be used for filtering or refining the collected data.

Operation 612 includes generating a site location map based on the estimated site locations. For example, as described herein, a user interface is displayed showing the estimated locations and that can also indicate other associated information, such as the traffic usage or flow at each of the estimated site locations. Again, this criteria can be filtered or adjusted to display different data.

Modifications and variations are contemplated, such as using additional filters. For example, the data is filtered to eliminate noise in one example. In this case, it is recognized that there is a possibility that the cell ID and the MCC/MNC collections have a time gap. Due to synchronization issues, the cell ID collected on the a particular roaming partner network may be from a cell of a different roaming partner, which can result in over counting of cells for the roaming partner. This type of noise is filtered out by the record count in some examples (e.g., set a record count threshold range for a particular Cell ID).

In another example, the noise filtering is performed by filtering for the roaming partner public land mobile networks (PLMNs) and matching the cell ID with the home network cell database. As should be appreciated, because it is very unlikely that the unique roaming partner cell ID is matched with a home network cell ID in the area, the matched samples are considered to be the ones with delayed MCC/MNC. As should appreciated, one or more different filtering methods can be used in the various examples.

FIG. 7 also illustrates a flowchart 700 of exemplary operations associated with estimating a cellular site location. Operation 702 includes receiving data metrics. For example, data metrics are received from a plurality of devices corresponding to communications using a roaming carrier network as described herein. The data metrics are stored on the plurality of user devices during the communication using the roaming network, for example, while the plurality of user devices are withing the roaming carrier network. The data metrics are received using a home carrier network. That is, the data metrics are transmitted when the user device is not in the roaming carrier network, but has returned to the home carrier network.

Operation 704 includes filtering the data metrics. For example, the data metrics are filtered to identify a particular roaming carrier network as described herein. Operation 706 includes grouping the filtered data metrics, such as grouping the filtered data metrics corresponding to a cell within the roaming carrier network. As such, data metrics for a particular roaming carrier network can be analyzed.

Operation 708 includes determining the source of a signal corresponding to the cell. As described herein, different methods can be used to determine the source of the signal, including the estimating the location of the source of the signal. Operation 710 includes estimating the location of the cellular site. For example, the location of the cellular site is estimated using the location information for the source of the signal.

Thus, various examples calculate the location of cellular site locations, particularly roaming cell cite locations. The results are displayable on a map that can be filtered.

Figure 8:
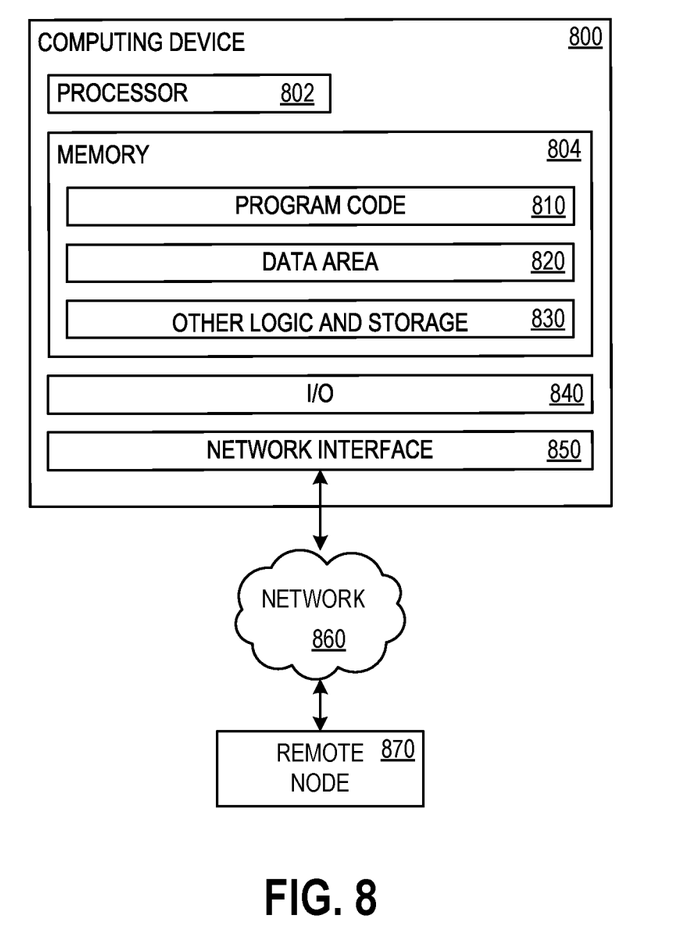
FIG. 8 illustrates a block diagram of a computing device suitable for implementing various aspects of the disclosure.

FIG. 8 illustrates a block diagram of computing device 800 that may be used as a component of the arrangement 100 of FIG. 1, for example, as any component described herein that may require computational or storage capacity. The computing device 800 has at least a processor 802 and a memory 804 that holds program code 810, a data area 820, and other logic and storage 830. The memory 804 is any device allowing information, such as computer executable instructions and/or other data, to be stored and retrieved. For example, the memory 804 may include one or more random access memory (RAM) modules, flash memory modules, hard disks, solid-state disks, persistent memory devices, and/or optical disks. The program code 810 comprises computer executable instructions and computer executable components including any instructions necessary to perform operations described herein. The data area 820 holds any data necessary to perform operations described herein. The memory 804 also includes other logic and storage 830 that performs or facilitates other functions disclosed herein or otherwise required of computing device 800. An input/output (I/O) component 840 facilitates receiving input from users and other devices and generating displays for users and outputs for other devices. A network interface 850 permits communication over a network 860 with a remote node 870, which may represent another implementation of computing device 800.

Additional Examples

An example method of estimating a cellular site location comprises: receiving data metrics from a plurality of user devices corresponding to communications using a roaming carrier network, the data metrics stored on the plurality of user devices during the communication using the roaming carrier network, the data metrics received using a home carrier network; filtering the received data metrics to identify the roaming carrier network; grouping the filtered data metrics corresponding to a cell within the roaming carrier network; determining a source of a signal corresponding to the cell; and estimating the location of the cellular site corresponding the source of the signal.

An example system for cellular site location estimation comprises: a processor; and a computer-readable medium storing instructions that are operative upon execution by the processor to: receive data metrics from a plurality of user devices corresponding to communications using a roaming carrier network, the data metrics stored on the plurality of user devices during the communication using the roaming carrier network, the data metrics received using a home carrier network; filter the received data metrics to identify the roaming carrier network; group the filtered data metrics corresponding to a cell within the roaming carrier network; determine a source of a signal corresponding to the cell; and estimate the location of the cellular site corresponding the source of the signal.

One or more example computer storage devices has computer-executable instructions stored thereon, which, upon execution by a computer, cause the computer to perform operations comprising: receiving data metrics from a plurality of user devices corresponding to communications using a roaming carrier network, the data metrics stored on the plurality of user devices during the communication using the roaming carrier network, the data metrics received using a home carrier network; filtering the received data metrics to identify the roaming carrier network; grouping the filtered data metrics corresponding to a cell within the roaming carrier network; determining a source of a signal corresponding to the cell; and estimating the location of the cellular site corresponding the source of the signal.

Alternatively, or in addition to the other examples described herein, examples include any combination of the following:

- filtering the received data metrics using a mobile county code (MCC) and a mobile network code (MNC), grouping the filtered data metrics using a cell identifier (ID), and determining the source of the signal using one of a level of a reference signal received power (RSRP) or geographic location information including latitude and longitude;
- wherein estimating the cellular site location comprises combining locations of a plurality of cells with a same eNodeB ID, and further comprising determining a center of the plurality of cells with the same eNodeB ID, the center being the estimated cellular site location;
- wherein the data metrics comprise at least a mobile county code (MCC), a mobile network code (MNC), an Evolved-UMTS Terrestrial Radio Access Network (E-UTRAN) global Cell ID (ECI), a latitude, and a longitude;
- wherein the data metrics are collected by the plurality of user devices in response to a triggering event and received at defined time intervals, and further comprising aggregating the collected data metrics in a cloud storage;
- wherein determining the source of the signal comprises performing a weighted average of longitude and latitude of the plurality of user devices based on a strength of the signal using a reference signal received power (RSRP);
- estimating the locations of a plurality of cellular sites, generating a roaming site location map using the estimated locations, and displaying the roaming site location map including a plurality of indicators identifying the locations of the plurality cellular sites, wherein a characteristic of each indicator of the plurality of indicators corresponds to a level of data traffic determined as a number of connections associated with each of the cellular sites; and
- filtering noise corresponding to the source of the signal using a threshold range of record counts corresponding to each of the cellular sites.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one example or may relate to several examples. The examples are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

The phrase "one or more of the following: A, B, and C" means "at least one of A and/or at least one of B and/or at least one of C." The phrase "and/or", as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one implementation, to A only (optionally including elements other than B); in another implementation, to B only (optionally including elements other than A); in yet another implementation, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of" "only one of" or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computerized method of estimating a cellular site location, the method comprising:
   receiving, at a home carrier network, data metrics from a plurality of different user devices corresponding to communications using a roaming carrier network, the data metrics stored on the plurality of different user devices during the communications using the roaming carrier network;
   filtering the received data metrics using a mobile country code (MCC) and a mobile network code (MNC) to identify the roaming carrier network;
   grouping the filtered data metrics corresponding to a cell within the roaming carrier network;
   determining a source of a signal corresponding to the cell based on the grouped filtered data metrics; and
   estimating the cellular site location using the determined source of the signal, the estimating including combining locations of a plurality of cells with a same eNodeB ID and determining a center of the plurality of cells with the same eNodeB ID, the center being the estimated cellular site location.

2. The computerized method of claim 1, further comprising:
   grouping the filtered data metrics using a cell identifier (ID); and
   determining the source of the signal using one of a level of a reference signal received power (RSRP) or geographic location information including latitude and longitude.

3. The computerized method of claim 1, wherein the data metrics from the plurality of different user devices are collected on different triggering events.

4. The computerized method of claim 1, wherein the data metrics are collected by the plurality of different user devices in response to a triggering event and received at the home carrier network at defined time intervals, and further comprising:
   aggregating the collected data metrics in a cloud storage, wherein the collected data metrics comprise at least the mobile county code (MCC), the mobile network code (MNC), an Evolved-UMTS Terrestrial Radio Access Network (E-UTRAN) global Cell ID (ECI), a cell ID, a latitude, and a longitude.

5. The computerized method of claim 1, wherein determining the source of the signal further comprises:
   performing a weighted average of longitude and latitude of the plurality of different user devices based on a strength of the signal using a reference signal received power (RSRP).

6. The computerized method of claim 1, further comprising:
   estimating the locations of a plurality of cellular sites;
   generating a roaming site location map using the estimated locations of the plurality of cellular sites; and
   displaying the roaming site location map, including a plurality of indicators identifying the estimated locations of the plurality of cellular sites, wherein a characteristic of each indicator of the plurality of indicators corresponds to a level of data traffic determined as a number of connections associated with each of the plurality of cellular sites.

7. The computerized method of claim 6, further comprising:
   filtering noise corresponding to the source of the signal using a threshold range of record counts corresponding to each cellular site of the plurality of cellular sites.

8. A system for cellular site location estimation, the system comprising:
   a processor; and
   a computer-readable medium storing instructions that are operative upon execution by the processor to:
      receive, at a home carrier network, data metrics from a plurality of different user devices corresponding to communications using a roaming carrier network, the data metrics stored on the plurality of different user devices during the communication using the roaming carrier network;
      filter the received data metrics using a mobile country code (MCC) and a mobile network code (MNC) to identify the roaming carrier network;
      group the filtered data metrics corresponding to a cell within the roaming carrier network;
      determine a source of a signal corresponding to the cell based on the grouped filtered data metrics, including by performing a weighted average of longitude and latitude of the plurality of different user devices based on a strength of the signal using a reference signal received power (RSRP); and
      estimate the cellular site location using the determined source of the signal.

9. The system of claim 8, wherein the computer-readable medium storing instructions are further operative upon execution by the processor to:
   group the filtered data metrics using a cell identifier (cell ID); and
   determine the source of the signal using one of a level of the reference signal received power (RSRP) or geographic location information including the latitude and the longitude.

10. The system of claim 8, wherein the computer-readable medium storing instructions are further operative upon execution by the processor to:
combine locations of a plurality of cells with a same eNodeB ID; and
determine a center of the plurality of cells with the same eNodeB ID, the center being the estimated cellular site location.

11. The system of claim 8, wherein the data metrics are collected by the plurality of different user devices in response to a triggering event and received at the home carrier network at defined time intervals, and the computer-readable medium storing instructions are further operative upon execution by the processor to:
aggregate the collected data metrics in a cloud storage, wherein the data metrics comprise at least the mobile county code (MCC), the mobile network code (MNC), an Evolved-UMTS Terrestrial Radio Access Network (E-UTRAN) global Cell ID (ECI), a cell ID, the latitude and the longitude.

12. The system of claim 8, wherein at least a portion of the data metrics are received at the home carrier network upon a user device of the plurality of different user devices returning to the home carrier network after using the roaming carrier network.

13. The system of claim 8, wherein the computer-readable medium storing instructions are further operative upon execution by the processor to:
estimate the locations of a plurality of cellular sites;
generate a roaming site location map using the estimated locations of the plurality of cellular sites; and
display the roaming site location map, including a plurality of indicators identifying the estimated locations of the plurality of cellular sites, wherein a characteristic of each indicator of the plurality of indicators corresponds to a level of data traffic determined as a number of connections associated with each of the plurality of cellular sites.

14. The system of claim 13, wherein the computer-readable medium storing instructions are further operative upon execution by the processor to:
filter noise corresponding to the source of the signal using a threshold range of record counts corresponding to each cellular site of the plurality of cellular sites.

15. One or more computer storage devices having computer-executable instructions stored thereon, which, upon execution by a computer, cause the computer to perform operations comprising:
receiving, at a home carrier network, data metrics from a plurality of different user devices corresponding to communications using a roaming carrier network, the data metrics stored on the plurality of different user devices during the communication using the roaming carrier network;
filtering the received data metrics using a mobile country code (MCC) and a mobile network code (MNC) to identify the roaming carrier network;
grouping the filtered data metrics corresponding to a cell within the roaming carrier network using a cell identifier (cell ID);
determining a source of a signal corresponding to the cell based on the grouped filtered data metrics and using one of a level of a reference signal received power (RSRP) or geographic location information including latitude and longitude; and
estimating the cellular site location using the determined source of the signal.

16. The one or more computer storage devices of claim 15, wherein the operations further comprise:
generating a map of cellular site locations; and
displaying the estimated cellular site location on the generated map.

17. The one or more computer storage devices of claim 15, wherein the operations further comprise:
combining locations of a plurality of cells with a same eNodeB ID; and
determining a center of the plurality of cells with the same eNodeB ID, the center being the estimated cellular site location.

18. The one or more computer storage devices of claim 15, wherein the data metrics are collected by the plurality of different user devices in response to a triggering event and received at the home carrier network at defined time intervals, and wherein the operations further comprise:
aggregating the collected data metrics in a cloud storage, wherein the data metrics comprise at least the mobile county code (MCC), the mobile network code (MNC), an Evolved-UMTS Terrestrial Radio Access Network (E-UTRAN) global Cell ID (ECI), a cell ID, the latitude, and the longitude.

19. The one or more computer storage devices of claim 15, wherein determining the source of the signal comprises:
performing a weighted average of longitude and latitude of the plurality of different user devices based on a strength of the signal using the reference signal received power (RSRP).

20. The one or more computer storage devices of claim 15, wherein the operations further comprise:
estimating the locations of a plurality of cellular sites;
generating a roaming site location map using the estimated locations of the plurality of cellular sites; and
displaying the roaming site location map, including a plurality of indicators identifying the estimated locations of the plurality of cellular sites, wherein a characteristic of each indicator of the plurality of indicators corresponds to a level of data traffic determined as a number of connections associated with each cellular site of the plurality of cellular sites.

* * * * *